United States Patent
Turner

(10) Patent No.: US 10,866,380 B2
(45) Date of Patent: Dec. 15, 2020

(54) METHOD AND APPARATUS FOR DEPLOYMENT OF A COMMUNICATION LINE ONTO A SURFACE SUCH AS A ROADWAY OR PATHWAY

(71) Applicant: TRAXyL, INC., Warrenton, VA (US)

(72) Inventor: Daniel R. Turner, Warrenton, VA (US)

(73) Assignee: TRAXyL, INC., Warrenton, VA (US)

( * ) Notice: Subject to any disclaimer, the term of this patent is extended or adjusted under 35 U.S.C. 154(b) by 0 days.

(21) Appl. No.: 16/047,799

(22) Filed: Jul. 27, 2018

(65) Prior Publication Data
US 2019/0033550 A1 Jan. 31, 2019

Related U.S. Application Data

(60) Provisional application No. 62/538,189, filed on Jul. 28, 2017.

(51) Int. Cl.
*G02B 6/50* (2006.01)
*E02F 5/10* (2006.01)
(Continued)

(52) U.S. Cl.
CPC ............ *G02B 6/504* (2013.01); *E01C 19/004* (2013.01); *E01C 19/522* (2013.01);
(Continued)

(58) Field of Classification Search
CPC ...... G02B 6/504; G02B 6/4459; G02B 6/443; E01C 23/0973; E01C 23/0993;
(Continued)

(56) References Cited

U.S. PATENT DOCUMENTS 1,399,681 A * 12/1921 Austin .................. E01C 19/002
404/77
1,467,243 A * 9/1923 Fitzgerald ............... E01C 19/42
404/98
(Continued)

FOREIGN PATENT DOCUMENTS

DE 101 63 464 C1 6/2003
FR 2750717 A1 1/1998
(Continued)

OTHER PUBLICATIONS

Chuang, Shun L., et al., "Fiber Optical Sensors for High-Speed Rail Applications", Final Report for High-Speed Rail IDEA Project 19, Innovations Deserving Exploratory Analysis Programs, Aug. 2003, (40 pages).

*Primary Examiner* — Edwin J Toledo-Duran
(74) *Attorney, Agent, or Firm* — Troutman Pepper Hamilton Sanders LLP

(57) ABSTRACT

A method for adhering a tubular body onto a surface that includes smoothing a portion of the surface to create a smoothed segment of the surface and applying a tubular body directly onto the smoothed segment of the surface after the smoothing of the portion of the surface. The surface at the smoothed segment is smoother than the remainder of the surface. The method further includes applying an uncured protectant onto the tubular body while the tubular body is on the smoothed segment of the surface and curing the uncured protectant into a cured protectant while the uncured protectant is on the tubular body on the smoothed segment of the surface. The cured protectant protectively encases and adheres the tubular body to the surface.

19 Claims, 4 Drawing Sheets

(51) Int. Cl.
  *G02B 6/44* (2006.01)
  *E01C 23/02* (2006.01)
  *E01C 23/09* (2006.01)
  *E01C 19/00* (2006.01)
  *E01C 19/52* (2006.01)

(52) U.S. Cl.
  CPC ...... *E01C 23/0953* (2013.01); *E01C 23/0973* (2013.01); *E01C 23/0993* (2013.01); *E02F 5/101* (2013.01); *G02B 6/4459* (2013.01); *E01C 23/025* (2013.01); *G02B 6/443* (2013.01)

(58) Field of Classification Search
  CPC .. E01C 19/522; E01C 23/0953; E01C 19/004; E01C 23/025; E02F 5/101
  USPC ............... 405/174–183, 155, 156, 131, 128; 219/213; 588/252; 175/16; 404/77, 79, 404/89, 95–98, 105, 110, 106; 138/105; 280/96, 43.1, 43.2, 43.22, 81.5, 86.757; 280/103; 425/458, 218, 63, 64; 180/19.2, 332; 249/2, 8, 208
  See application file for complete search history.

(56) References Cited

U.S. PATENT DOCUMENTS

| | | | | |
|---|---|---|---|---|
| 1,946,972 | A * | 2/1934 | Heltzel | E01C 23/026 404/74 |
| 2,098,870 | A * | 11/1937 | Heltzel | E01C 23/028 404/89 |
| 2,324,760 | A * | 7/1943 | Brulotte | F16L 1/038 405/155 |
| 2,636,425 | A * | 4/1953 | Heltzel | E01C 23/026 404/89 |
| 2,931,444 | A * | 4/1960 | Mills | E01H 1/003 172/13 |
| 3,080,800 | A * | 3/1963 | Malzahn | E01C 19/24 404/95 |
| 3,261,272 | A * | 7/1966 | Jennings, Jr. | E01C 19/4893 404/98 |
| 3,313,321 | A * | 4/1967 | Keller | F16L 59/15 138/105 |
| 3,377,932 | A * | 4/1968 | Atkinson | E01C 23/025 404/51 |
| 3,394,554 | A * | 7/1968 | Kinnan | E02F 5/08 405/183 |
| 3,552,417 | A | 1/1971 | Goff | |
| 3,600,773 | A * | 8/1971 | Davis | E01C 19/4893 425/63 |
| 3,664,137 | A * | 5/1972 | Lett | E02F 5/10 405/50 |
| 3,713,300 | A * | 1/1973 | Ward | E02F 5/103 405/182 |
| 3,911,390 | A | 10/1975 | Myers | |
| 4,027,990 | A * | 6/1977 | Merrill | E01C 19/4886 404/98 |
| 4,084,928 | A * | 4/1978 | Petersik | B28B 1/084 404/100 |
| 4,145,155 | A * | 3/1979 | Ogaki | E01C 19/4893 404/104 |
| 4,175,885 | A * | 11/1979 | Jeppson | E01C 7/32 404/31 |
| 4,310,293 | A * | 1/1982 | Eggleton | E01C 19/4893 404/100 |
| 4,437,789 | A * | 3/1984 | Kasiewicz | E02F 5/101 405/155 |
| 4,507,012 | A * | 3/1985 | Corcoran | E01C 23/06 404/110 |
| 4,521,767 | A | 6/1985 | Bridge | |
| 4,566,823 | A * | 1/1986 | May | E01C 19/4893 404/98 |
| 4,630,965 | A * | 12/1986 | Nguyen | C08L 95/00 222/175 |
| 4,767,234 | A * | 8/1988 | Rizzo | E01C 19/16 118/108 |
| 4,769,201 | A * | 9/1988 | Chiuminatta | B24B 19/02 264/154 |
| 4,789,266 | A * | 12/1988 | Clarke, Jr. | E01C 19/187 404/104 |
| 4,790,687 | A * | 12/1988 | Wright | E02D 3/046 37/367 |
| 4,867,606 | A * | 9/1989 | Wright | E02D 3/046 405/182 |
| 4,929,051 | A | 5/1990 | Rogler et al. | |
| 4,936,763 | A * | 6/1990 | Thomas | E01C 19/4893 264/33 |
| 4,984,932 | A * | 1/1991 | Leone | E01C 19/4893 404/72 |
| 5,009,546 | A * | 4/1991 | Domenighetti | B62D 55/02 404/110 |
| 5,018,955 | A * | 5/1991 | Parrish | E01C 19/4893 249/2 |
| 5,260,520 | A | 11/1993 | Muhs et al. | |
| 5,366,023 | A * | 11/1994 | Souza | A01G 25/06 171/10 |
| 5,484,224 | A * | 1/1996 | Lynch | E01C 23/065 404/77 |
| 5,527,129 | A * | 6/1996 | McKinnon | E01C 19/506 404/98 |
| 5,582,899 | A * | 12/1996 | Chiuminatta | B24B 19/02 264/154 |
| 5,879,109 | A * | 3/1999 | Finzel | E02F 5/12 138/105 |
| 5,934,831 | A | 8/1999 | Mayr et al. | |
| 6,189,244 | B1 * | 2/2001 | Johnson | E02F 5/06 37/349 |
| 6,236,798 | B1 * | 5/2001 | Finzel | E01F 11/00 385/136 |
| 6,293,728 | B1 * | 9/2001 | Eggleton | E01C 11/223 404/98 |
| 6,450,730 | B1 * | 9/2002 | Matthias | E01C 19/4893 404/101 |
| 6,540,435 | B1 * | 4/2003 | Lizarraga | E01C 19/4893 249/2 |
| 6,863,470 | B2 * | 3/2005 | Eggleton | E01C 19/4893 404/98 |
| 7,033,104 | B2 * | 4/2006 | Corcoran | E01C 23/14 404/77 |
| 7,112,746 | B2 | 9/2006 | Tsukahara et al. | |
| 7,614,827 | B1 * | 11/2009 | Makk | A01G 25/06 405/182 |
| 7,871,256 | B2 * | 1/2011 | Techlin | E04G 21/04 425/64 |
| 8,080,901 | B2 | 12/2011 | Doraisamy | |
| 8,668,405 | B1 * | 3/2014 | Singleton | E01C 19/238 404/128 |
| 9,316,343 | B2 * | 4/2016 | O'Hara | F16M 1/04 |
| 9,537,292 | B2 | 1/2017 | Gustavsson et al. | |
| 9,880,369 | B2 | 1/2018 | Elford et al. | |
| 9,904,029 | B1 | 2/2018 | Hendrickson et al. | |
| 10,209,476 | B2 | 2/2019 | Johnston et al. | |
| 10,268,016 | B1 * | 4/2019 | Turner | G02B 6/443 |
| 2002/0038716 | A1 | 4/2002 | Pineda | |
| 2003/0113165 | A1 * | 6/2003 | Eggleton | E01C 19/4893 404/98 |
| 2004/0144765 | A1 * | 7/2004 | Heindtel | E01C 19/48 219/213 |
| 2005/0191133 | A1 * | 9/2005 | Purcell | G02B 6/504 405/157 |
| 2007/0033840 | A1 * | 2/2007 | Schmidt | E02F 3/7609 37/383 |
| 2010/0299994 | A1 * | 12/2010 | Kneussle | E02F 5/101 47/1.01 R |
| 2010/0310312 | A1 * | 12/2010 | Mahler | E01C 19/48 404/95 |
| 2011/0315259 | A1 | 12/2011 | Kelly | |
| 2012/0066987 | A1 | 3/2012 | Malofsky et al. | |

(56) References Cited

U.S. PATENT DOCUMENTS

| | | | |
|---|---|---|---|
| 2014/0020815 A1 | 1/2014 | Dickinson et al. | |
| 2014/0270971 A1 | 9/2014 | Allouche et al. | |
| 2014/0294917 A1 | 10/2014 | Palchik et al. | |
| 2015/0125218 A1 | 5/2015 | Gustavsson et al. | |
| 2015/0129126 A1* | 5/2015 | Saito ........................ | G02B 6/46 |
| | | | 156/307.7 |
| 2015/0310964 A1 | 10/2015 | Larson et al. | |

FOREIGN PATENT DOCUMENTS

| | | |
|---|---|---|
| FR | 2 762 155 A1 | 10/1998 |
| JP | H07-318741 A | 12/1995 |
| JP | H09-224313 A | 8/1997 |
| JP | 2002-131024 A | 5/2002 |
| WO | 99/35346 A1 | 7/1999 |

* cited by examiner

METHOD AND APPARATUS FOR DEPLOYMENT OF A COMMUNICATION LINE ONTO A SURFACE SUCH AS A ROADWAY OR PATHWAY

TECHNICAL FIELD

The present disclosure relates to an apparatus and method for deploying a tubular body onto a surface such as a roadway or pathway. The disclosure also relates to a deployment system. The tubular body may be a communication line, such as a fiber optic cable.

BACKGROUND

Communication lines or communication cables (i.e., examples of tubular bodies) provide useful conduits to transfer information (e.g., audio, visual, etc.) using modern technology. An example of a communication line is a fiber optic cable. The deployment and installation of communication lines, however, can be challenging for several reasons. For example, communication lines may need to extend over relatively long distances to, e.g., provide a telecommunications to a commercial or residential building. Additionally, the communication lines may need to be accessible (e.g., for maintenance or repairs). At the same time, however, the communication lines may need to be protected from the environment and are often preferred to be hidden from view.

The usual process for installing a communication cable over a relatively long distance often consists of extruding plastic core tubes around fibers, helically wrapping the tubes around a central strength member, building up several layers of protective sheathing, surrounding the sheathing with a protective material (armor) such as steel, and surrounding the armor with a heavy polymer jacket. Once a cable is manufactured, it can be pulled through conduits, hung along telephone poles, and/or buried inside trenches. Additional possibilities include what is known as "micro-trenching" (see e.g., International Patent Application Publication No. 09/935,346), where an extremely small trench is cut into the road surface or the ground. The cable is then installed within the micro-trench or installed on a roadway in the layers of protective sheathing as described above. Another example is described in U.S. Patent Application Publication No. 2002/0038716 where a flat fiber conduit is used for further protection.

The use of armor and other materials increases the weight, fabrication cost, and installation foot-print of the fiber cable. The larger installation footprint often requires the significant disruption and repair of the installed route, all of which contributes to higher installation cost.

When installing below the surface, fiber cables can either be directly buried or installed into a conduit to further protect the cable. As noted above, the cable and conduit are often installed by trenching into the ground. The use of the conduit requires the added cost and overhead of conduit installation along with the fiber cable manufacturing and installation. Additionally, cutting the micro-trench adds expense and time to the installation process.

Aerial installations are performed by draping communication cables on communication or power distribution poles. Although this can provide for a quicker install than trenching or micro-trenching, this installation method introduces several downsides. Even if the power distribution poles are properly located, the poles could already be holding the maximum weight allowed, rendering them useless for expansion. Additionally, trees, buildings, personal property, and other utilities often interfere with the installation of new poles or cables. Installers are endangered by the height at which they must work and the often dangerous voltages in their work area. Overhead installations may be affected by unavoidable weather conditions, such as ice storms or thunderstorms. These environmental conditions often damage overhead installations for extended periods of time and require expensive repairs (also, e.g., owners of utility or power distribution poles may require a per pole recurring rental fee). Additionally, aerial installations are not aesthetically pleasing, compared to lower-visibility installation techniques.

Plowing, direct burial, or other similar cable installation methods often require an array of machines. For example, a machine that utilizes a cutting blade to trench through soil or other natural ground substances may be needed. The communication cable may be installed in a process described in French Patent No. 2,762,155, which involves: (i) cutting a trench, (ii) burying a cable in the trench; and then (iii) backfilling the trench with a filler material suitable for the ground surface. This installation technique may cause significant disruption to local roadway infrastructure with attendant business impacts and transportation delays.

Installing a communication cable by micro-trenching is similar to a trenching or plowing install, but the cutting tool and ground opening are smaller. Less filler material may also be required. The micro-trenching installation technique is mainly used on roadways and often utilizes a heavy duty diamond saw blade that cuts a narrow (e.g., only a few inches wide) section of a roadway or similar surface to a predetermined depth depending on the location. A communication cable is installed or micro duct is inserted for later filling with a communication cable. After that, the micro-trench is backfilled with an aggregate and another acceptable material. The risks of this technique (e.g., as described in International Patent Application Publication No. 09/935,346) include accidentally severing an existing utility line, damaging the integrity of the road surface, and risks to installers due to traffic and other safety concerns. Micro-trenching is not preferred in surfaces such as in private roads, shallow road surfaces, bridges, and tunnels, to name a few.

U.S. Pat. No. 9,588,315 discloses a tubular body installation method by the present inventor that may help address some of the problems described above. This prior patent is hereby incorporated by reference. The tubular body or communication line installation method may involve applying a communication line or tubular body directly on to the surface. An uncured protectant may subsequently be applied on top of the tubular body that is on the surface and shaped to form a protective layer around the communication line or tubular body that is on the surface. When the protectant cures, the communication line or tubular body is adhered to the surface while being protectively encased in the cured protectant.

One issue that may arise when employing the installation method disclosed in the inventor's prior patent (U.S. Pat. No. 9,588,315) is that the communication line or tubular body may not be smoothly/uniformly applied to the surface due to slight surface defects, cavities, cracks, etc. That is, a natural roadway surface includes irregularities that can affect the installation and affixation of some communication lines. For example, a fiber optic cable may possess a very small diameter (e.g., approximately 80-900 microns), and so even small irregularities (e.g., even at a microscopic level) in the roadway surface may affect the installation of the cable and/or the ability to adhere the cable directly to the surface. For example, the distributed optical fiber could receive areas of point-stress as the length of the fiber is not making uniform contact along an uneven surface.

SUMMARY

The deployment method disclosed in this application includes a step of smoothing (as further elaborated on below) the surface before the installation of the cable. Another aspect of the disclosure involves a deployment apparatus and a deployment system that involves smoothing the surface before deploying the tubular body or communication line on to the surface. The tubular body may thus be installed with greater precision and may result in a stronger adhering bond to the surface. For example, the installation in this manner may further reduce point loads along the length of the tubular body (e.g., an optical fiber). The smoothing process may provide a benefit in better bonding the protective material to the surface (and thus the tubular body within the protective material to the surface) while not compromising the integrity of the surface by opening a channel into and/or extending below the surface that allows for the ingress of water or any other undesired fluids/materials into and below the surface.

One aspect of the disclosure involves a method for adhering a tubular body onto a surface that includes smoothing a linear portion of the surface to create a smoothed linear segment of the surface and applying a tubular body directly onto the smoothed linear segment of the surface after the smoothing of the linear portion of the surface. The surface at the smoothed linear segment is more smooth (smoother) than the surface at a remainder of the surface. The method further includes applying an uncured protectant directly onto the tubular body while the tubular body is directly on the smoothed linear segment of the surface and curing the uncured protectant into a cured protectant while the uncured protectant is directly on the tubular body on the smoothed linear segment of the surface. The cured protectant protectively encases and adheres the tubular body to the surface.

In another aspect, the disclosure relates to a deployment apparatus for adhering a communication line to a surface. The apparatus includes a main body that is moveable in an advancing direction and a smoothing apparatus connected to the main body. The smoothing apparatus is configured to contact the surface and smooth a linear segment of the surface when the apparatus moves in the advancing direction. The apparatus includes a communication line holder configured to deploy the communication line onto the linear segment of the surface. The communication line holder is mounted on the main body. The communication line holder is positioned closer to the rear end of the main body than the communication line holder so that smoothing apparatus contacts the linear segment of the surface to smooth the linear segment of the surface before the communication line is deployed on to the linear segment of the surface. The apparatus has a container configured to store an uncured protectant. The container is mounted on the main body. The apparatus includes a protectant applicator connected to the container and configured to eject the protectant onto the surface. The protectant applicator is positioned closer to the rear end of the main body than the communication line holder so that the ejected protectant is applied onto the communication line that has been deployed on the surface.

DETAILED DESCRIPTION

The dimensions in the figures may be exaggerated for illustrative purposes.

Figure 1:
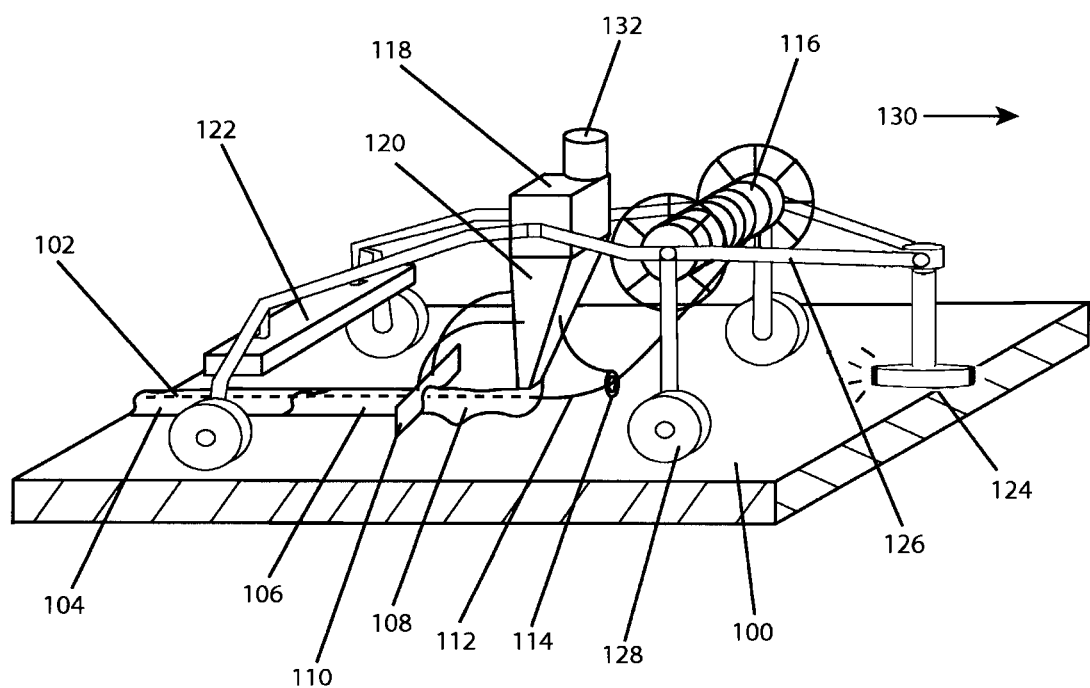
FIG. 1 illustrates a perspective view of a deployment apparatus according to an embodiment of the disclosure.

FIG. 1 shows a perspective view of one embodiment of a deployment apparatus. The deployment apparatus is configured to move along a surface 100 to apply a tubular body 102 onto a surface 100. The tubular body may be, for example, a communication line (e.g., a fiber optic cable).

At a high level, the deployment apparatus is configured to: smooth a segment of the surface with a smoothing apparatus 124, apply the tubular body 102 onto the segment of the surface that has been smoothed, and apply an uncured protectant onto the tubular body 102. When the uncured protectant cures into a cured protectant 104, the tubular body 102 may be firmly adhered to the surface 100 while being encased within the cured protectant 104. The cured protectant 104 may help protect the tubular body 102 from damage (e.g., due to vehicle tires, weather forces, snow plows, etc.).

The deployment apparatus includes a main body, which the other components discussed here may be mounted on to (i.e., connected or attached to). A deployment system may also be employed, where the different features described here are mounted on different apparatuses. One skilled in the art will recognize that different configurations and apparatuses can be used to implement the method described in this application.

The deployment apparatus may include the smoothing apparatus 124 as mentioned above. FIG. 1 illustrates one embodiment of the smoothing apparatus 124, but additional embodiments of the smoothing apparatus 124 are discussed below. The general purpose of the smoothing apparatus 124 is to smooth a portion of the surface 100 prior to deploying or applying the tubular body 102 onto the surface 100.

As discussed in the background section above, many surfaces may contain irregularities such as cracks, crevices, protrusions, etc. The irregularities may be very small and may be difficult or even impossible to detect with the unaided eye (i.e., naked eye). If the surface 100 that receives the tubular body 102 has these irregularities, the bond between the tubular body 102 and the surface 100 may not be as strong (for example, a portion of the tubular body 102 may be on a protrusion of the surface and thus not be fully encased by the cured protectant 104). Additionally, irregularities in the surface 100 could damage the tubular body 102, especially if the tubular body 102 is relatively small (and relatively fragile), such as a fiber optic cable.

Therefore, the smoothing apparatus 124 contacts the surface 100 to smooth the surface 100. In other words, the smoothing apparatus 124 levels the surface 100 (i.e., makes the surface 100 more planar than prior to the smoothing) to remove irregularities that may exist in the surface. More specifically, the smoothing apparatus 124 contacts only a portion of the surface 100. When the deployment apparatus advances in the advancing direction 130, the smoothing apparatus 124 levels (i.e., smooths) a segment of the surface 100, so that the leveled (i.e., smoothed) segment of the surface 100 is more smooth (i.e., possesses less irregularities) relative to the other portions of the surface that were not contacted by the smoothing apparatus 124. In some embodiments, the smoothing apparatus 124 may be configured to level (i.e., smooth) a linear segment or a linear strip of the surface 100, so that the tubular body 102 may be easily applied to the smoothed linear segment or linear strip of the surface 100. Note that the "linear" segment does not need to be entirely linear. For example, the linear segment 200 can possess changes in direction and/or small curves depending on the orientation of the surface 100 and/or any obstacles on the surface 100. In general, the linear segment 200 will extend in a relatively linear fashion, but the linear segment is not limited to being strictly linear.

Figure 2:
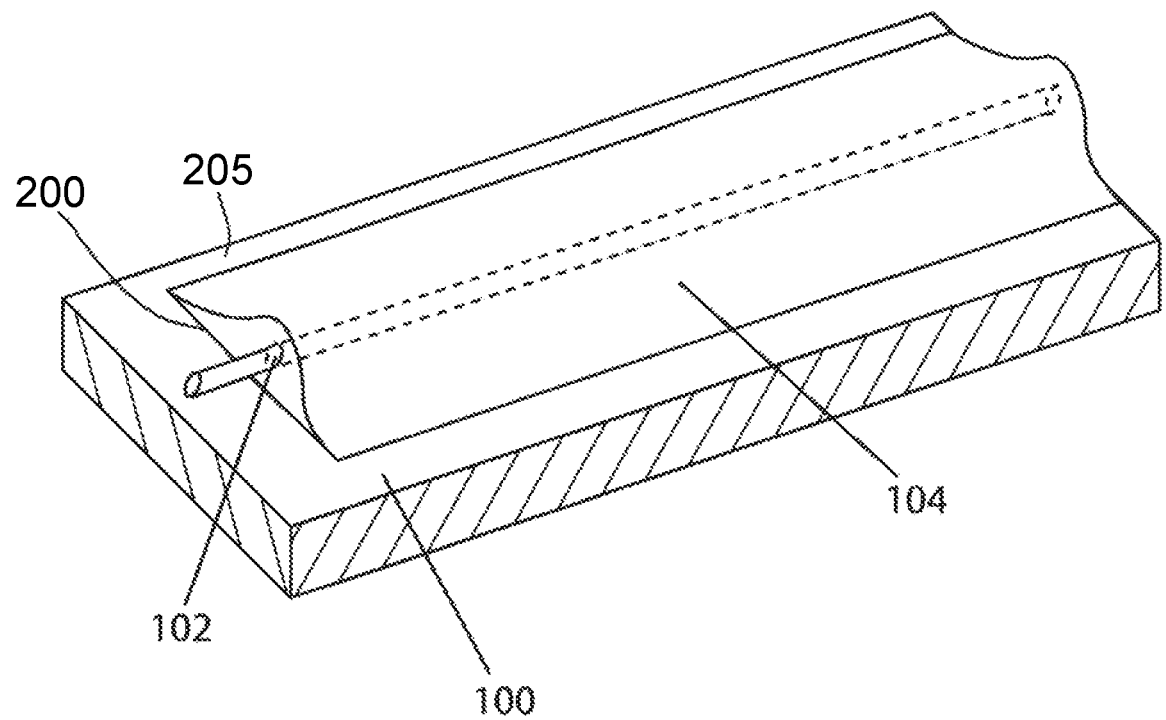
FIG. 2 illustrates a perspective view of a tubular body encased in a protectant along a smoothed linear segment of a surface according to an embodiment of the disclosure.
Figure 3:
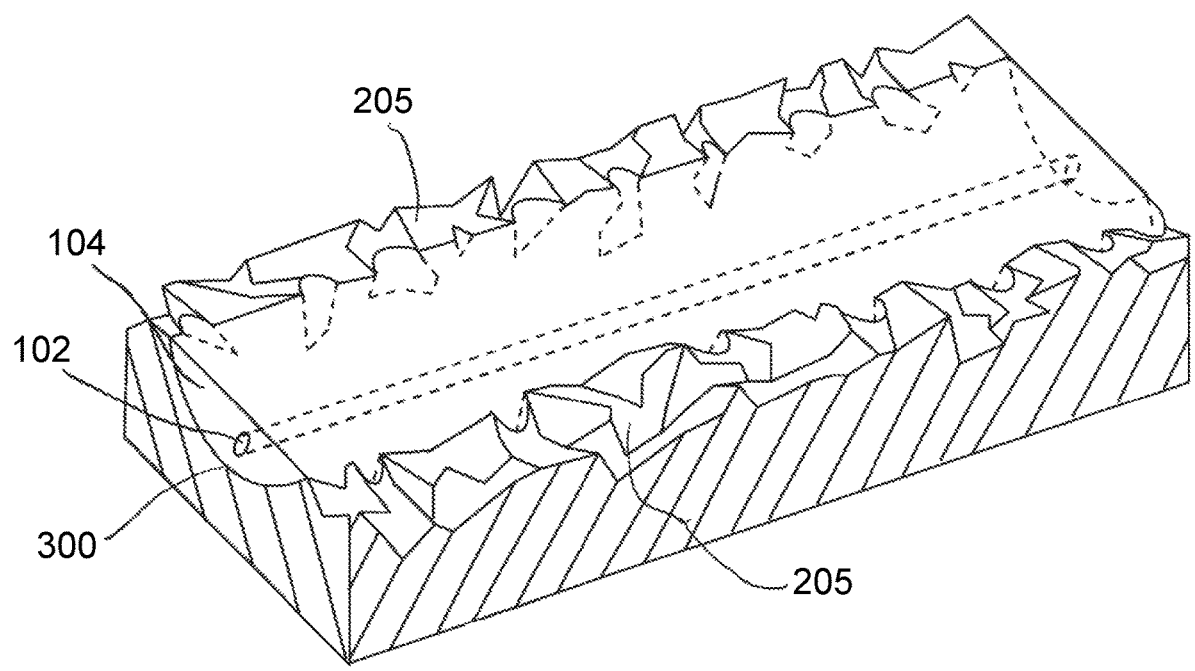
FIG. 3 illustrates a perspective view of a tubular body encased in a protectant along a smoothed linear segment of a surface according to an embodiment of the disclosure.

FIG. 2 illustrates the tubular body 102 and the cured protectant 104 on a smoothed linear segment 200 of the surface 100. The smoothed linear segment 200 may be a smoother surface (i.e., possess less irregularities such as cracks, crevices, and protrusions) than the remaining areas of the surface 100 that were not smoothed or leveled by the smoothing apparatus 124 and which thus possess surface irregularities 205. FIGS. 3-4C show more prominently depicted examples of the surface irregularities 205.

Additional examples of the smoothing apparatus 124 and features thereof are explained below in relation to FIGS. 3-4D. Before turning to these examples and features, additional possible aspects of the deployment apparatus or deployment system are described.

In some embodiments, the deployment apparatus includes a protectant shaping template 110, which is mounted to a protectant applicator 120 as shown in FIG. 1. A bare communication line guide 114 may be mounted to protectant applicator 120. The guide 114 may be a ring, tube, or similar structure to guide the application of the bare communication line 112 onto the surface 100. The protectant applicator 120 may be mounted to a protectant container 118 as shown in FIG. 1. The protectant container 118 may store (i.e., contain), for example, uncured protectant. The uncured protectant may be a liquid that cures into a solid (e.g., a resin).

In some embodiments, an air pump 132 may be attached to the protectant container 118. The air pump 132 may provide a constant or intermittent positive pressure to the interior of the protectant container 118. The air pump 132 may thus be configured to cause uncured protectant within the container to be ejected out of the protectant application (i.e., out of the nozzle or discharge hole as shown in FIG. 1). The protectant container 118 may be mounted to a chassis 126 that forms or is a portion of the main body of the deployment apparatus.

A curing lamp 122 may be mounted to chassis 126 in some embodiments as shown in FIG. 1. A set of wheels 128 (e.g., four wheels) can be mounted to chassis 126. The wheels allow the apparatus to move in a direction of travel 130 (i.e., an advancing direction) along a predetermined route on a surface 100 such as asphalt. The apparatus may be moved in the advancing direction 130 through a variety of different methods. For example, a vehicle with a tow hitches (not shown) can be connected to chassis 126 near the front of the apparatus and can apply a driving force to move the chassis 126 forward. A power source (e.g., an engine) may also be provided as part of the main body to propel the chassis 126 in the advancing direction.

FIG. 1 also illustrates that a spool 116 may be mounted to the chassis 126. The spool 116 may hold a predetermined length of a bare communication line 112 such as optical fiber. As illustrated, the bare communication line 112 may be wound around the spool 116. The bare communication line 112 may unwind from spool 116 at a rate commensurate with the apparatus speed in the direction of travel 130 (i.e., advancing direction). The bare communication line 112 may pass through the bare communication line guide 114 as described above before the bare communication line 112 is placed directly on the surface 100.

The protectant container 118 may hold (i.e., store or contain) an unshaped protectant 108 material as discussed above. The unshaped protectant 108 can be moved from the protectant container 118 and into the protectant applicator 120 by, for example, a positive air pressure applied by the air pump 132. The apparatus does not have to have an air pump 132, however, as positive pressure may also be introduced into the protectant container 118 by many other methods. In some embodiments, no positive pressure may be applied, and instead the uncured protectant is released due to gravity.

The protectant applicator 120 is configured to eject the unshaped protectant 108 onto the bare communication line 112 that is on the surface 100. The unshaped protectant 108 may be applied in this manner to completely surround the bare communication line 112 as it lays on surface 100.

As noted above, the deployment apparatus may include a protectant shaping template 110. The protectant shaping template 110 may be positioned behind where the bare communication line 112 is applied in the advancing direction 130 (i.e., the protectant shaping template 110 may contact the ground at a position more towards the rear side relative to where the bare communication line 112 is applied). The unshaped protectant 108 (along with the bare communication line 112) may pass through protectant shaping template 110 when the deployment apparatus is moved in the advancing direction 130. The protectant shaping template 110 may shape the unshaped protectant into a shaped protectant 106 as shown in FIG. 1. That is, the protectant shaping template 110 may include a hole or aperture through which the unshaped protectant 108 passes when the deployment apparatus advances in the advancing direction 130. The unshaped protectant 108 may thereby be formed to take the shape of the hole or aperture of the protectant shaping template 110. In some embodiments, the hole or aperture may be a half-circle, a half-oval, or possess a curved/sloped hole to create a more parabolic shape. The hole of the protectant shaping template 110, however, is not limited to any particular shape. In other embodiments, the shaping template 110 may be omitted and the uncured protectant may simply by applied by the protectant applicator 120. For example, the uncured protectant may be sprayed by the protectant applicator 120 to, for example, take the desired shape without using a shaping template 110 (i.e., the cross-section of the nozzle opening and position of the nozzle of the protectant applicator 120 may direct the uncured protectant to take the desired shape).

The deployment apparatus may include a curing lamp 122 in some embodiments. An example of a curing lamp 122 is shown in FIG. 1. The uncured protectant, however, may also be a material that cures without a curing heat source. Therefore, the curing lamp 122 may not be provided in some embodiments. In still further embodiments the curing lamp 122 or any other curing apparatus may be utilized separately from the deployment apparatus. The curing lamp 122 may apply heat, UV radiation, IR radiation, etc. to cure the shaped (uncured) protectant 106 to a cured protectant 104. The cured protectant 104 encloses (encases) the communication line 112 to adhere the communication line 112 to the surface 100, which results in the installed communication line, which is one example of the tubular body 102. The cured protectant 104 may provide a hardened and weatherproof encasement for the installed tubular body 102.

The unshaped protectant 108 held in protectant container 118 of the embodiment of FIG. 1 may be an ultraviolet cured urethane resin. Sources of the material are available from Sunrez Corporation of El Cajon, Calif., 92020, or Epoxies, Etc. of Cranston, R.I., 02921. The resin may be selected based on predetermined viscosity, non-conductivity, hardness, cured strength, impact resistance, service temperature, and adhesive tensile shear characteristics. The resin may be selected to have a long service life and to meet flammability and other compliance requirements when cured, for application onto the intended surface. The cured protectant 104 may be formulated to withstand the dynamic and static pressures presented by both pedestrian and vehicle traffic as the bond of cured protectant 104 to surface 100 is robust.

A curing lamp 122 may be tailored to the specific protectant used. FIG. 1 illustrates an exemplary high power ultraviolet lamp capable of curing the resin, for example, in approximately two to five seconds.

The protectant container 118 and protectant applicator 120 may be opaque to ultraviolet light to block the light from causing any unwanted curing inside these components.

The overall material thickness of the cured protectant 104 may be approximately three to ten millimeters. The cured protectant 104 may not degrade the frictional coefficient required by a vehicle tire against surface 100, even when wet.

FIG. 2 illustrates an example of the cured protectant 104 encasing the tubular body 102 on the surface 100 and adhering the tubular body 102 to the surface 100. More specifically, FIG. 2 shows the cured protectant 104 adhering the tubular body 102 to the smoothed linear segment 200 of the surface 100. The smoothed linear segment 200 of the surface 100 is a linear portion that has been smoothed by the smoothing apparatus 124 (before application of the tubular body 102 directly onto the surface 100). The smoothed linear segment 200 is more smooth (smoother) than the remaining areas of the surface 100 that possess relatively more irregularities 205.

When the protectant cures, the shape of cured protectant 104 may take the shape shown in FIG. 2 to, for example, provide low resistance to vehicle tires that may drive over the installation. The protectant may also cure to form a stronger bond in the smoothed linear segment 200 of the surface 100 than if the protectant were applied to non-smoothed areas of the surface with relatively more surface irregularities 205.

FIG. 3 illustrates another exemplary embodiment of the tubular body 102 being encased in the cured protectant 104 on the surface 100. More specifically, FIG. 3 illustrates a perspective view of a portion of the surface 100. The surface 100 is shown in FIG. 3 to more prominently illustrate the surface irregularities 205. These surface irregularities 205 may be much smaller than the dimensions/proportions shown in FIG. 3, but the surface irregularities 205 can be better understood by the possibly exaggerated dimensions.

FIG. 3 also illustrates a smoothed linear segment 300 in the surface 100 similar to the smoothed linear segment 200 shown in FIG. 2. The smoothed linear segment 300 of this embodiment, however, possesses a slightly curved shape. That is, the smoothed linear segment 300 is slightly curved or arc-shaped. The tubular body 102 may be applied at the center of the curve or arc-shape as shown in FIG. 3. The cured protectant 104 may be applied on top of the tubular body 102 in the smoothed linear segment 300.

Importantly, the smoothed linear segment 300 may be formed without cutting into the surface 100. The smoothed linear segment 300 may be formed by simply smoothing, etching, sanding, shaving, indenting, or leveling the surface irregularities 205 that may be naturally formed in the surface 200. The smoothed linear segment 300 may be formed without using a cutting tool, a saw, or other similar apparatus that cuts a groove into the surface 100.

Figure 4A:
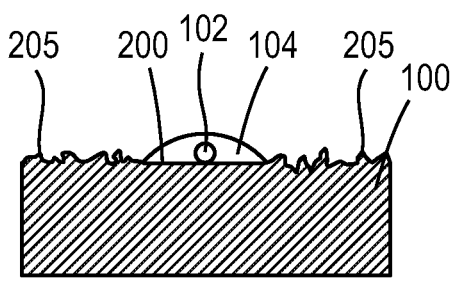
FIG. 4A illustrates a cross-sectional view of a tubular body encased in a protectant on a surface according to an embodiment of the disclosure.

FIG. 4A illustrates a cross-sectional view of the tubular body 102 on the surface 100 that is shown in FIG. 2. The surface 100 possesses surface irregularities 205 as described above. FIG. 4A helps to illustrate that the smoothed linear segment 200 of the surface 100 is relatively smoother (i.e., has less surface irregularities) than the remaining area of the surface 100. The tubular body 102 may be applied directly to the surface 100 at the smoothed linear segment 200 as is shown in FIG. 4A, and then the cured protectant 104 may surround the tubular body 102 to encase and adhere the tubular body to the smoothed linear segment 200 of the surface 100.

Figure 4B:
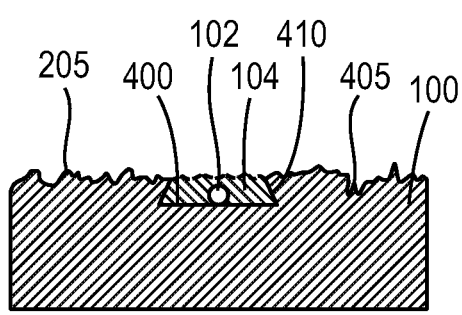
FIG. 4B illustrates a cross-sectional view of a tubular body encased in a protectant on a surface according to an embodiment of the disclosure.
Figure 4C:
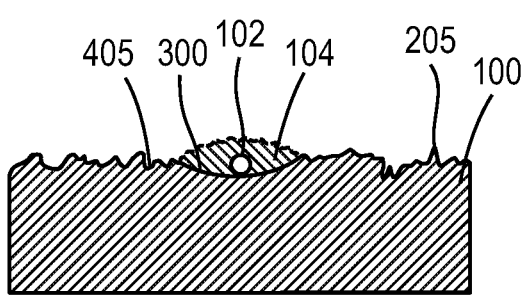
FIG. 4C illustrates a cross-sectional view of a tubular body encased in a protectant on a surface according to an embodiment of the disclosure.

FIG. 4B illustrates a cross-sectional view of the tubular body 102 on the surface 100 with another embodiment of the smoothed linear segment 400. In other words, a different smoothing apparatus may be used to create the smoothed linear segment 400 in the surface 100. The remaining areas of the surface 100 still possess relatively more surface irregularities. The smoothed linear segment 400 may be formed so that it is co-planar with the lowest crevice 405 that naturally exists in the surface. In other words, the smoothed linear segment 400 is formed by smoothing, leveling, indenting, etching, melting, etc. the surface 100 so that the surface is level (planar) at the depth of the lowest crevice 405 for a predetermined width.

The smoothed linear segment 400 may possess angled side walls 410. These angled side walls 410 formed within the surface irregularities 205 may facilitate retaining the cured protectant 104 within the smoothed linear segment 400. The shape of the angled side walls 410 is not limited in any respect, however, and could be curved, angled inward, angled outward, etc. Using a smoothing apparatus 124 that creates angled side walls 410, however, may be particularly beneficial in creating a strong bond between the protectant and the surface 100.

FIG. 4C illustrates a cross-sectional view of the tubular body 102 on the surface 100 that is shown in FIG. 3. As described above, the smoothed linear segment 300 possesses a slightly curved shape. The lower-most point of the curved shape of the smoothed linear segment 300 may be at the same depth (or slightly above) the lowest crevice 405 naturally existing in the surface 100. In other words, the smoothed linear segment 300 is a smoothed or leveled portion of the surface 100 and is not a groove that is cut into the surface.

As discussed above, FIG. 1 illustrates one example of a smoothing apparatus 124. The smoothing apparatus 124 of FIG. 1 may be reciprocating brush, sanding device, grinding device, etc. As shown in FIG. 1, the smoothing apparatus 124 may possess an axis of rotation that is orthogonal to the surface 100. In other words, the smoothing apparatus 124 rotates about a central axis that is perpendicular or orthogonal relative to the plane of the surface 100.

The smoothing apparatus 124 of FIG. 1 may possess a smoothing face that contacts the surface 100 to smooth the linear segment 200, 300, 400 of the surface 100. The smoothing face may be any relatively abrasive material that is configured to smooth the surface. For example, the smoothing face may utilize an abrasive mineral such as calcite, emery, diamond (e.g., diamond dust), novaculite, pumice, rouge, sand, corundum (alumina or aluminium oxide), garnet, sandstone, Tripoli, feldspar, staurolite, cubic boron nitride, ceramic, glass powder, a steel abrasive, silicon carbide (carborundum), zirconia alumina, boron carbide, slags, or any combination thereof. The material of the smoothing apparatus 124, however, is not limited to any of these example materials.

Figure 4D:
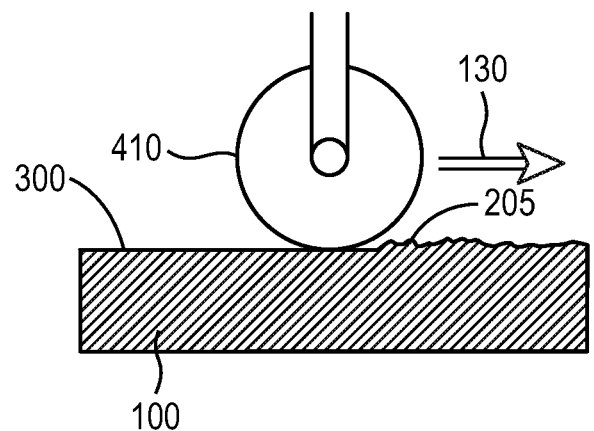
FIG. 4D illustrates a side view of a smoothing apparatus smoothing a surface according to an embodiment of the disclosure.

FIG. 4D illustrates another exemplary embodiment of a smoothing apparatus 410. The smoothing apparatus 410 has a reciprocating smoothing surface that contacts the surface 100 to create the smoothed linear segment 300. The smoothing apparatus 410 may also be configured to create the smoothed linear segment 200. The smoothing apparatus 410 rotates about an axis that is parallel to the plane of the surface 100. The smoothing apparatus 410 may be, for example, a steel wheel that levels the surface to remove surface irregularities 205 along a linear segment (linear strip) of the surface 100. The smoothing apparatus 410 could alternatively or in addition utilize any of the materials discussed above, but is in no way limited to any specific material(s).

FIG. 4D illustrates that the smoothing apparatus 410 may be advanced in the advancing direction 300 to smooth out the surface irregularities 205 to create the smoothed linear segment 300 after the smoothing apparatus 410 has smoothed out the surface irregularities 205. In another embodiment, the smoothing apparatus 410 may be specifically shaped to create the smoothed linear segment 400 as shown in FIG. 4B. The smoothing apparatus 410 may possess a profile at the outer edge of the smoothing apparatus 410 (i.e., where the apparatus 410 contacts the surface 100) that creates a smoothed linear segment with a cross-section such as that shown for smoothed linear segments 200, 300, 400 or any other desired cross-section.

The smoothing apparatus 410 may be used with the deployment apparatus illustrated in FIG. 1. Mounting each of the various components (i.e., including the smoothing apparatus 410) to the main body of the deployment apparatus beneficially allows for a simple, efficient installation of the tubular body 102 by moving a single device forward in the advancing direction 130. However, the smoothing apparatus 410 could also be used as a separate component of a deployment system (i.e., the smoothing apparatus 410 could be a standalone piece of equipment).

The smoothing apparatus 124, 410 could also be non-reciprocating. For example, the smoothing apparatus 124, 410 could simply be pressed against the surface to level/smooth the surface as the deployment apparatus advances without being a reciprocating (rotating) wheel or other body. The smoothing apparatus 124, 410 could in some embodiments be a spike or similar object (e.g., a blunt force impactor such as a ball bearing or rod) that contacts the surface to form a smoothed linear segment 200, 300, 400 in the surface 100.

In some embodiments, the smoothing apparatus 124, 410 could be relatively heavy. That is, the smoothing apparatus 124, 410 and could smooth the surface 100 by compressing the surface 100 by virtue of the weight of the smoothing apparatus 124, 410. When the smoothing apparatus 124, 410 is a non-reciprocating body that levels the surface 100 by applying a relatively heavy weight on to the surface, the smoothed linear segment 200, 300, 400 may be a small indentation into the surface. In other words, the relatively heavy smoothing apparatus 124, 410 may level/smooth the surface 100 by indenting the surface 100.

The shape of the smoothing apparatus 124, 410 is in no way limited to the embodiments shown in FIGS. 1 and 4D. The smoothing apparatus 124, 410 could possess any cross-sectional shape that will smooth the surface 100 as explained above when the smoothing apparatus 124, 410 is advanced along the surface 100. For example, the smoothing apparatus 124, 410 could possess a cross-sectional shape that is square, rectangular, triangular, hexagonal, etc.

In some embodiments, the smoothing apparatus 124, 410 could be heated. That is, the temperature of the smoothing apparatus 124, 410 that contacts the surface 100 could be raised to be higher than ambient temperature (for example, significantly higher, such as 50° F., 100° F., 200° F., 300° F., or more above the ambient temperature). The smoothing apparatus 124, 140 may thus cause at least some melting of the surface 100, which becomes the smoothed linear segment 200, 300, 400. Heating the smoothing apparatus 124, 140 may be performed in conjunction with any of the embodiments discussed above, or may be performed separately as the way to smooth the surface 100.

Figure 4E:
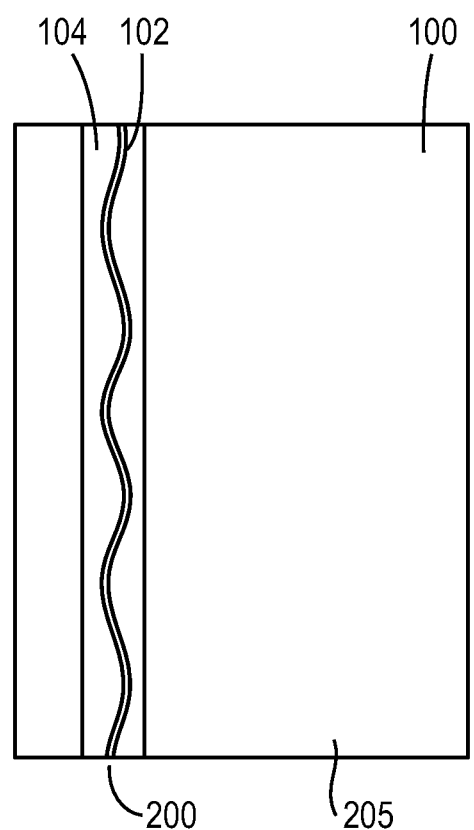
FIG. 4E illustrates a plan view of a tubular body encased in a protectant on a surface according to an embodiment of the disclosure.

FIG. 4E illustrates an additional aspect of the deployment method disclosed here. FIG. 4E shows a plan view (i.e., top view) of a tubular body 102 adhered onto the surface 100 by the cured protectant 104. More specifically, the tubular body 102 is adhered to a smoothed linear segment 200 of the surface 100. The smoothed linear segment 200 possesses fewer surface irregularities 205 than the remaining areas of the surface 100 and is formed by any of the manners described above.

The tubular body 102 shown in FIG. 4E is deployed and adhered to possess a sinusoidal shape. That is, the tubular body 102 is adhered to the surface 100 while possessing arcs/curves relative the surface 100. In other words, the tubular body 102 may possess a sinusoidal shape despite extending within the smoothed linear segment 200. A sinusoidally-shaped tubular body 102 may beneficially allow for maintenance and repair of the tubular body. For example, if the tubular body 102 is a fiber optic cable, and a repair is required to a portion of the fiber optic cable after a period of use, the sinusoidal deployment of the fiber optic cable allows for a portion of the fiber optic cable to be removed while the fiber optic cable remains able to extend along the same length of the surface 100 (i.e., splicing an additional segment of fiber optic cable into the existing cable is not required). In other words, a sinusoidally shaped tubular body may contain an amount of flexibility so as to allow the sinusoidally shaped tubular body to stretch under tension. The amount of stretch could cause the tubular body to become an entirely straight tubular body without compromising the integrity of the tube and/or structure. When the tension is relaxed, the tubular body may return to the sinusoidally shaped body. This extension and contraction could occur repeatedly. Additionally, the sinusoidally shaped tubular body allows for the expansion and contraction of the surface, without increasing tension along the tubular body, or anything within the tubular body. The expansion and contraction of the surface could potentially cause the surface to crack, whether through temperature, humidity, or mechanical stress. The sinusoidally shaped tubular body could thus bridge over cracks as the surface expands, preventing tension from compromising the tubular body. The sinusoidally shaped tubular body could be manufactured with the desired shape prior to the deployment of the tube, or the desired shape could be implemented during the installation process.

Deploying the tubular body 102 to provide for the benefits described above is not limited to a sinusoidal pattern as shown in FIG. 4E, but may take any other shape that allows for an extra length of the tubular body 102 to be included on the smoothed linear segment 200 of the surface 100. Also, there could be one, or a multitude of tubular bodies in parallel on the surface 100.

While various exemplary embodiments of the disclosed deployment apparatus, deployment system, and deployment method have been described above, it should be understood that these exemplary embodiments have been presented for purposes of example only, and are not limitations. The exemplary embodiments are not exhaustive and do not limit the disclosure to the precise form disclosed. Modifications and variations are possible in light of the above teachings or may be acquired from practicing of the disclosure, without departing from the breadth or scope.

What is claimed is:

1. A method for adhering a tubular body onto a man-made surface, the man-made surface being planar, the method comprising:
   smoothing a linear portion of the man-made surface to create a smoothed linear segment of the man-made surface, the smoothed linear segment being more smooth than the man-made surface at a remainder of the man-made surface, the remainder of the man-made surface comprising surface irregularities introduced when the man-made surface was created, and the smoothed linear segment being above or at a same depth as a lowest point of the surface irregularities;
   applying the tubular body directly onto the smoothed linear segment of the man-made surface after the smoothing of the linear portion of the man-made surface;
   applying an uncured protectant directly onto the tubular body while the tubular body is directly on the smoothed linear segment of the man-made surface; and
   curing the uncured protectant into a cured protectant while the uncured protectant is directly on the tubular body on the smoothed linear segment of the man-made surface, the cured protectant protectively encasing and adhering the tubular body to the smoothed linear segment of the man-made surface.

2. The method according to claim 1, wherein the linear portion of the man-made surface possesses a width of one foot or less.

3. The method according to claim 1, further comprising:
   shaping the uncured protectant while the uncured protectant is on the tubular body that is on the smoothed linear segment of the man-made surface before curing the uncured protectant, the uncured protectant being shaped to possess a cross-sectional shape.

4. The method according to claim 3, wherein the shaping is performed by a shaping tool comprising a hole, the hole of the shaping tool possessing the cross-sectional shape.

5. An apparatus for adhering a communication line to a paved surface, the paved surface being planar, the apparatus comprising:
   a main body moveable in an advancing direction, the main body possessing a forward end and a rear end;
   a smoothing apparatus connected to the main body, the smoothing apparatus being configured to contact the paved surface at a smoothing contact point to smooth a linear segment of the paved surface when the apparatus moves in the advancing direction;
   a plurality of rotatable bodies that contact a remainder of the paved surface spaced apart from the linear segment of the paved surface when the main body moves in the advancing direction, the remainder of the paved surface comprising natural surface irregularities introduced when the paved surface was formed, and the smoothing contact point of the smoothing apparatus being above or at a same depth as a lowest point of the natural surface irregularities of the remainder of the paved surface;
   a communication line holder configured to deploy the communication line onto the linear segment of the paved surface, the communication line holder being mounted on the main body, the communication line holder being positioned closer to the rear end of the main body than the smoothing apparatus so that the smoothing apparatus contacts the linear segment of the paved surface to smooth the linear segment of the paved surface before the communication line is deployed on to the linear segment of the paved surface;
   a container configured to store an uncured protectant, the container being mounted on the main body; and
   a protectant applicator connected to the container and configured to eject the protectant onto the linear segment of the paved surface, the protectant applicator positioned closer to the rear end of the main body than the communication line holder so that the ejected protectant is applied onto the communication line that has been deployed on the linear segment of the paved surface.

6. The apparatus according to claim 5, wherein the smoothing apparatus is a wheel.

7. The apparatus according to claim 6, wherein the wheel rotates about an axis that is orthogonal to a plane of the remainder of the paved surface that the plurality of rotatable bodies contact when the main body moves in the advancing direction.

8. The apparatus according to claim 6, wherein the wheel rotates about an axis that is parallel to a plane of the remainder of the paved surface that the plurality of rotatable bodies contact when the main body moves in the advancing direction.

9. The apparatus according to claim 5, wherein the smoothing apparatus is a heated wheel.

10. The apparatus according to claim 9, wherein the heated wheel exerts a pressure to smooth the paved surface to create the linear segment of the paved surface.

11. The apparatus according to claim 5, further comprising:
    a shaping template connected to the main body, the shaping template and being positioned to contact the remainder of the paved surface when the main body moves in the advancing direction.

12. The apparatus according to claim 11, wherein the protectant applicator is spaced apart from the shaping template, the protectant applicator being positioned closer to the forward end of the main body than the shaping template.

13. The apparatus according to claim 12, wherein
    the uncured protectant passes through the opening of the shaping template when the main body moves in the advancing direction and after the uncured protectant is ejected onto the linear segment of the paved surface, and the uncured protectant is curable into a solid protectant to encase the communication line after the uncured protectant has passed through the opening in the shaping template.

14. An apparatus for adhering a communication line to a surface, the apparatus comprising:

a main body moveable in an advancing direction, the main body possessing a forward end and a rear end;

a smoothing apparatus connected to the main body, the smoothing apparatus being configured to contact the surface at a smoothing contact point to smooth a linear segment of the surface when the apparatus moves in the advancing direction;

a plurality of rotatable bodies that contact a remainder of the surface spaced apart from the linear segment of the surface when the main body moves in the advancing direction, the plurality of rotatable bodies each rotating about an axis of rotation;

the smoothing apparatus being configured to rotate about an axis that is non-parallel to the axis of rotation of each of the plurality of rotatable bodies when the main body moves in the advancing direction;

a communication line holder configured to deploy the communication line onto the linear segment of the surface, the communication line holder being mounted on the main body, the communication line holder being positioned closer to the rear end of the main body than the smoothing apparatus so that the smoothing apparatus contacts the linear segment of the surface to smooth the linear segment of the surface before the communication line is deployed on to the linear segment of the surface;

a container configured to store an uncured protectant, the container being mounted on the main body; and a protectant applicator connected to the container and configured to eject the protectant onto the linear segment of the surface, the protectant applicator positioned closer to the rear end of the main body than the communication line holder so that the ejected protectant is applied onto the communication line that has been deployed on the linear segment of the surface.

15. The apparatus according to claim 14, further comprising:

a shaping template connected to the main body, the shaping template and being positioned to contact the linear segment of the surface when the main body moves in the advancing direction.

16. The apparatus according to claim 15, wherein the protectant applicator is spaced apart from the shaping template, the protectant applicator being positioned closer to the forward end of the main body than the shaping template.

17. The apparatus according to claim 16, wherein the uncured protectant passes underneath the shaping template when the main body moves in the advancing direction and after the uncured protectant is ejected onto the linear segment of the surface, and the uncured protectant is curable into a solid protectant to encase the communication line after the uncured protectant has passed underneath the shaping template.

18. The apparatus according to claim 14, wherein the smoothing apparatus is a brush.

19. The apparatus according to claim 14, wherein the smoothing apparatus is a wheel.

* * * * *